United States Patent

[11] 3,603,605

| [72] | Inventor | Benjamin C. Webster, Jr.<br>82 Birchwood Drive, Fairfield, Conn. |
|---|---|---|
| [21] | Appl. No. | 868,357 |
| [22] | Filed | Oct. 22, 1969 |
| [45] | Patented | Sept. 7, 1971 |

[54] ANTILIFT DOUBLE-ACTING CHUCK
6 Claims, 6 Drawing Figs.
[52] U.S. Cl. .................................................. 279/1 DA,
279/119, 279/123
[51] Int. Cl. .................................................. B23b 31/16
[50] Field of Search............................................ 279/110,
119, 66, 1 ME, 1 DA, 123, 1

[56] References Cited
UNITED STATES PATENTS
| 3,251,606 | 1966 | Oswald et al. ................ | 279/123 X |
| 3,494,627 | 2/1970 | Pirman ......................... | 279/123 X |

Primary Examiner—William S. Lawson
Assistant Examiner—James F. Coan
Attorney—Johnson & Kline ABSTRACT: A chuck having a main body provided with slides carrying jaws capable of I.D. or O.D. chucking with each slide provided with a binder member or plate automatically operable, in response to a predetermined partial clamping or chucking pressure applied by the jaw to the workpiece, to draw said slide downwardly on said main body and prevent the jaw from lifting the workpiece from its support and to seal said slide against entry of foreign material.

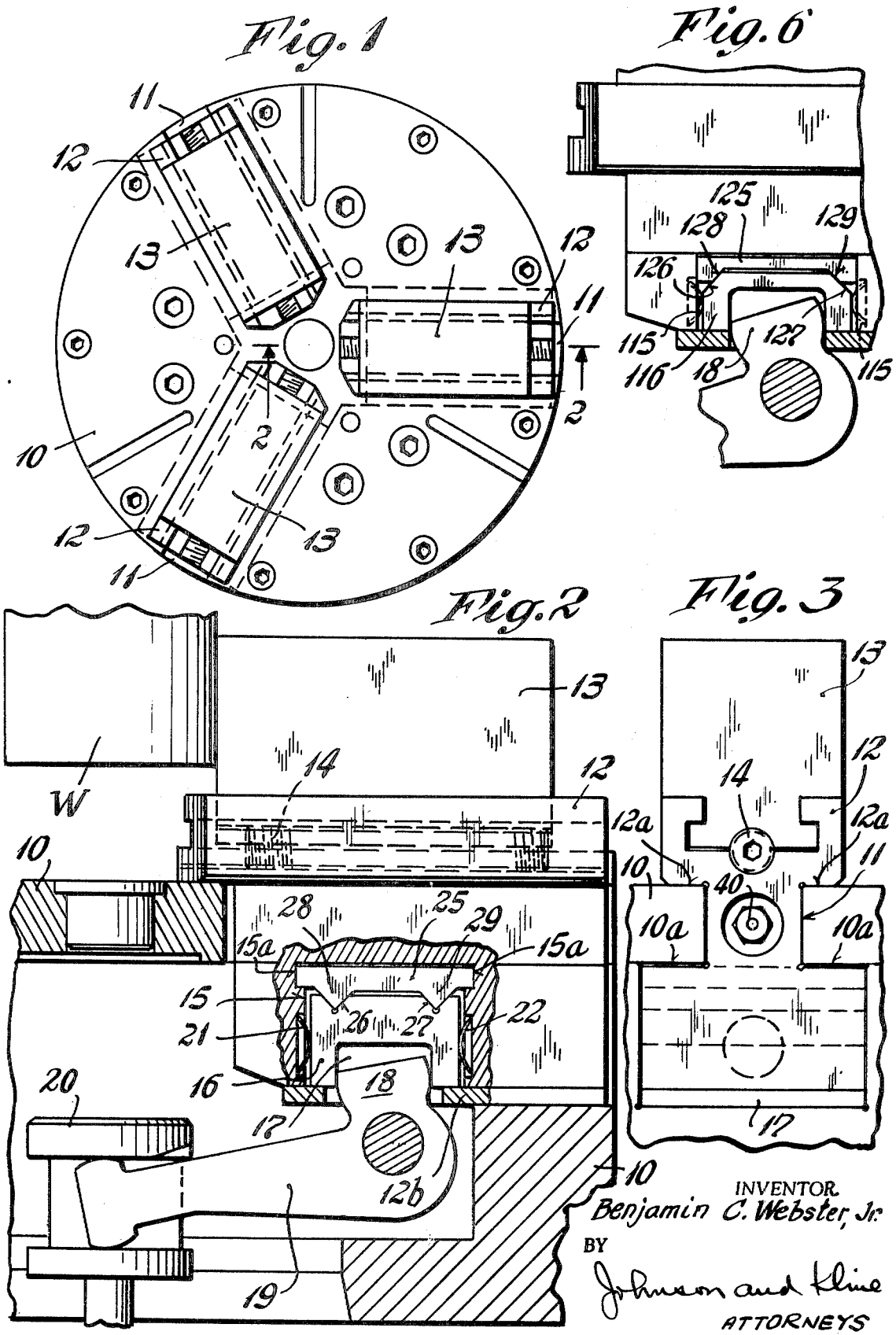

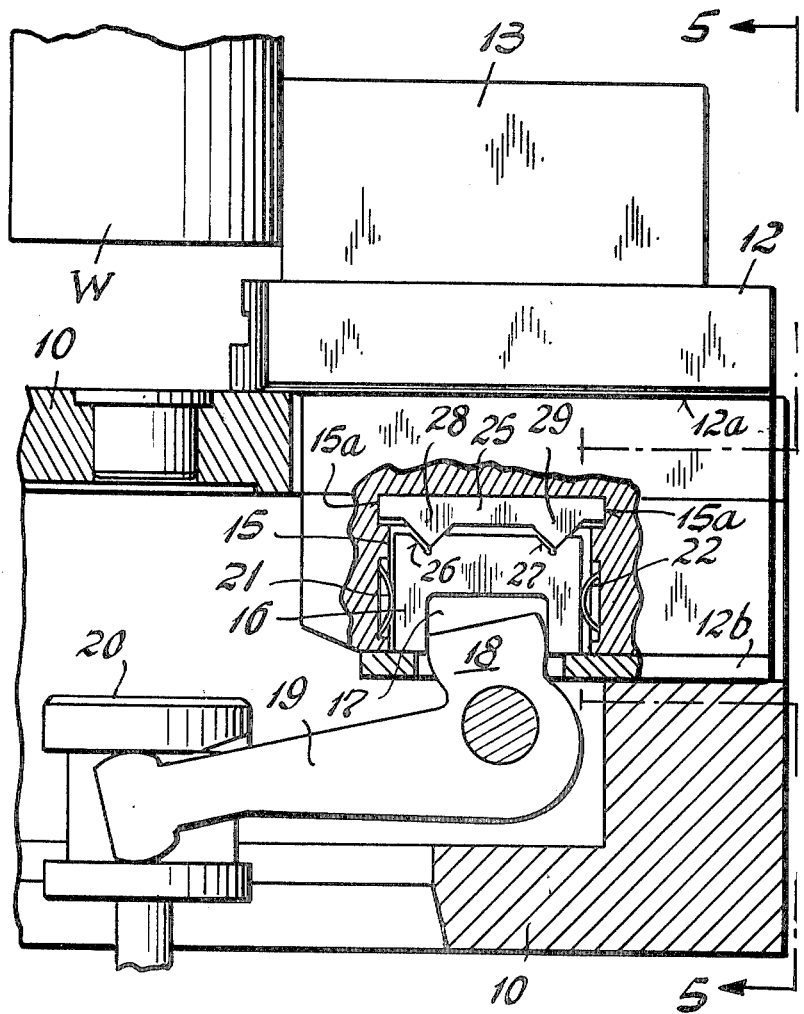
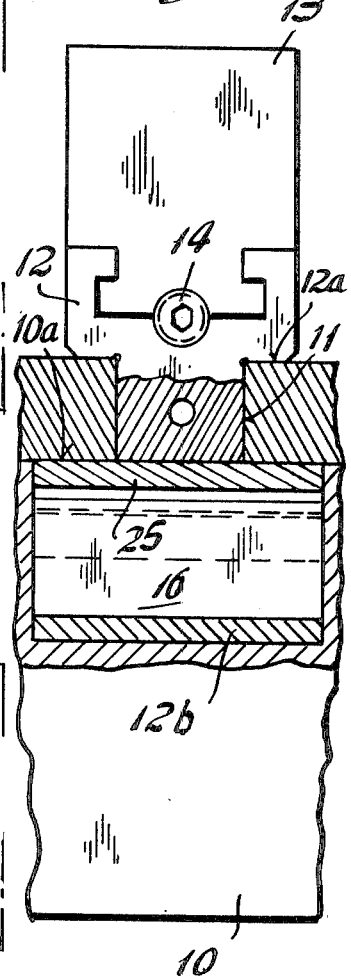
Fig. 4
Fig. 5

ANTILIFT DOUBLE-ACTING CHUCK

In the usual sliding jaw chucks, due to the necessary clearance in the slot to permit sliding motion and to the necessary manufacturing tolerances, the jaws tend to rise as chucking pressure is applied to the workpiece, thus lifting the workpiece from its proper position on the work rest. This increased when wear-surfaces of the slot and sliding jaw would wear from usage. Also, these devices were difficult to seal against entry of foreign matter as would cause abnormal wear. Efforts to overcome these problems have been attempted but they have been unsuccessful ro too difficult to manufacture and too expensive.

The present invention overcomes these difficulties by providing a simple antilift double-acting chuck which is effective to prevent tilting of the clamping jaw and undersired lifting of the workpiece, which chuck is simple to con..ruct and operate and provides protection against foreign matter entering the chucking mechanism.

This is accomplished by proving the slides for the jaws of the chuck with a normally inoperative binder plate which automatically becomes operative, when the jaws are moved into chucking position and apply a predetermined clamping or chucking pressure on a workpiece, to draw the slide into clamped relation to the body to prevent lifting of the jaws under said chucking pressure.

A feature of the invention resides in the novel actuator shoe and binder member or plate relation which does not interfere with the normal operation of the chuck but automatically locks the jaw against lifting the workpiece under the final clamping pressures and automatically releases upon unchucking of the workpiece.

The chuck of the present invention effectively seals the slide mechanism against entry of foreign material such as dust, dirt, chips, coolant and he like which will damage the moving parts.

Other features and advantages of the invention will be apparent from the specification and claims when considered in connection with the accompanying drawings in which:

FIG. 1 shows a face view of the chuck.

FIG. 2 is a sectional view taken along line 2—2 of FIG. 1.

FIG. 3 is a side view of FIG. 2.

FIG. 4 is similar to FIG. 2 showing the binder plate operated.

FIG. 5 is a sectional view taken along line 5—5 of FIG. 4.

FIG. 6 is another form of actuating shoe and binder plate assembly.

As shown in FIG. 1, the chuck has a main body 10 provided with a plurality of radially extending T-slots 11 slidably receiving slides 12, with the side edges 12a of the slides overlapping and engaging the outer surface of the body adjacent the T-slots, as is clear from FIG. 3.

Each of the slides has a clamping jaw 13 adjustably mounted thereon by the adjusting screw 14 (FIG. 2) and has a recess or a slot 15 in its undersurface carrying an actuating shoe 16. The recess is closed by an apertured plate 12b. The shoe has a socket 17 to receive the ball 18 of a pivoted actuating lever 19 extending through the apertured plate with the socket having sufficient clearance to permit operation of the ball in all positions thereof.

The lever is operated by the usual drawbar 20 or the like to move the slides on the main body of the chuck between chucking and unchucking positions with workpiece W. Moving the drawbar down in FIG. 2 will provide a movement of the jaws for O.D. chucking and moving the drawbar up will provide a movement of the jaws for I.D. chucking. The slides have free movement in the T-slots so as to be readily moved in either direction to chucking position by the actuating mechanism.

As shown in FIG. 2, the recess or slot 15 is slightly wider than the shoe 16 so that the shoe is mounted in the slide for slight relative movement in the direction of movement of the slide. It is held, however, in a normal neutral position, as shown in FIG. 2, by opposed springs 21, 22 interposed between the ends of the shoe and the walls of the recess or slot 15. These springs are so tensioned that they will be compressed by a predetermined partial pressure less than final chucking or clamping pressure. By way of example, the springs may have a tension of 100 0/sg. in. and the final chucking pressure of the jaw against the work may be 300 0/sq. in. The action of the springs will be described later.

As shown in FIGS. 2 and 3, the slide 12 carries a binder member or plate 25 which is normally supported on the top of the actuating shoe 16 and out of engagement with the undersurface of an inwardly facing shoulder 10a of the main body (FIGS. 2 and 3). The plate 25 is held against lateral movement, as shown in FIG. 2 by having its ends disposed in notches 15a in the side walls of the recess or slot 15. It will be noted that the upper surface of the actuating shoe in the form of the invention of FIG. 1 has a pair of V-notches 26, 27 therein into which cooperating V-shaped elements 28, 29 of the plate extend. The binder plate is thus held in its neutral position with the shoe by the coaction of these parts and does not engage the shoulder 12a so as to interfere with the free movement of the slide into clamping or chucking position. When the shoe 16 is actuated by the actuating lever 19, it acts through the spring and freely moves the slide 12 carrying the jaws 13 toward clamping and chucking position. When the pressure of the jaws against the work exceeds 100 0/sq. in. the spring 21 will be compressed. Compression of the spring will cause the shoe to move relative to the slide to the position shown in FIG. 4.

As the shoe moves relative to the slide and binder plate carried thereby, the cooperating inclined surfaces on the V-notches in V-shaped projections on the shoe and binder plate coact to cam the binder plate upwardly. This caUses the binder plate to engage the inwardly facing shoulder 10a in the T-slot and draw the slide downwardly toward the outer face of the body and securely hold it against lifting. The shoe continues to apply increased chucking pressure against the work through the compressed spring until it reaches a desired value of 300 0sq. in.

When the lever 19 is reversed, its movement will release the chucking pressure. As the chucking pressure falls below 1000/sq. in. the springs will automatically become operative and move the shoe to normal neutral position. This relative movement of the shoe will cause the binder plate to retract and release its antilift action.

In the form of the invention disclosed in FIG. 6, the mode of operation and structures are the same with the exception of the shoe 116 operating in the slot 115 and the cooperating binder plate 125. As shown, the shoe has inclined edges 126, 127 cooperating with inclined edge projections 128, 129 on the binder plate to cam the binder plate 125 into antilift position in response to relative movement of the shoe with respect to the slide.

The action of the binder plate not only holds the jaws against lifting the work from the usual work rests (not shown) but also clamps the slide in position so as to prevent foreign matter from entering under the slides to enter the slots, with the attendant interference with operation of the chuck and damage to the operating mechanism. Also, it seals in a lubricant as may be supplied by the fitting 40 on the end of the slide (FIG. 3).

Variations and modifications may be made within the scope of the invention and portions of the improvements may be used without others.

I claim:

1. A chuck comprising a main body having a plurality of slidable workpiece-clamping means thereon, each comprising a clamping jaw adjustably mounted on a slide slidable on the body, means freely moving the slide into and out of clamping position comprising an actuating shoe mounted on the slide for limited relative movement with respect to said slide from a neutral position in response to a predetermined partial pressure of the jaw against the workpiece, antilift means on the slide and operative after a predetermined partial clamping pressure of the jaw against the workpiece for drawing the slide and jaw carried thereby into firm engagement with the body to prevent lifting of the jaw and workpiece clamped thereby, and spring means engaging opposite sides of the actuating shoe to normally hold said shoe in said neutral position until said predetermined partial clamping pressure is achieved.

2. The invention as defined in claim 1 wherein said spring means on opposite sides of said shoe operate to actuate the antilift means for I.D. or O.D. chucking.

3. A chuck comprising a main body having a plurality of slidable workpiece-clamping means thereon, each comprising a clamping jaw adjustably mounted on a slide slidable on the upper surface of said body, means freely moving the slide into and out of clamping position comprising an actuating shoe mounted on the slide for limited relative movement with respect to said slide from a neutral position in response to a predetermined partial pressure of the jaw against the workpiece, and antilift means on the slide comprising a binder member freely mounted on said shoe for relative movement with respect thereto, said binder member having cam surfaces cooperating with said shoe and operative after a predetermined movement of said shoe in response to partial clamping pressure of the jaw against the workpiece for drawing the slide and jaw carried thereby into firm engagement with the upper surface of said body to prevent lifting of the jaw and workpiece clamped thereby.

4. A chuck comprising a main body having a plurality of slidable workpiece-clamping means thereon, each comprising a clamping jaw adjustably mounted on a slide slidable in a slot on the upper surface of the body and overlapping the edges of said slot, means freely moving the slide into and out of clamping position comprising an actuating shoe mounted on the slide for limited relative movement with respect to said slide from a neutral position in response to a predetermined partial pressure of the jaw against the workpiece, and antilift means on the slide comprising a binder member freely movable relative to said shoe and operative after a predetermined relative movement between said binder member and shoe in response to partial clamping pressure of the jaw against the workpiece for drawing the portion of the slide overlapping the edges of the slot into firm engagement with the upper surface of the body to seal the slot to prevent entry of foreign matter and to prevent lifting of the jaw and workpiece clamped thereby.

5. A chuck comprising a main body having a plurality of slidable workpiece-clamping means thereon, each comprising a clamping jaw mounted on a slide slidable in a slot formed in the body and riding on the outer surface of the body adjacent the edges of the slot, means freely moving the slide into and out of clamping position comprising an actuating shoe mounted on the slide for limited relative movement with respect to said slide from a neutral position in response to a predetermined partial pressure of the jaw against the workpiece, and an antilift means freely mounted on the shoe for relative movement thereto and movable into engagement with an inwardly facing shoulder adjacent the edges of said slot in response to said relative movement after a predetermined partial clamping pressure of the jaw against the workpiece for drawing the slide and jaw carried thereby into tight engagement with the outer surface of the body to prevent lifting of the jaw and workpiece clamped thereby.

6. The invention as defined in claim 5 wherein the binder member and shoe have coacting cam surfaces operative in response to relative movement between said binder member and shoe to move said binder member against said inwardly facing shoulder.

PO-1050
(5/69)

UNITED STATES PATENT OFFICE
CERTIFICATE OF CORRECTION

Patent No. 3,603,605        Dated September 7, 1971

Inventor(s) Benjamin C. Webster, Jr.

It is certified that error appears in the above-identified patent and that said Letters Patent are hereby corrected as shown below:

Column 1, line 12, "ro" should read --or--; line 16, "undersired" should read --undesired--; line 20, "proving" should read --providing--; line 35, "he" should read --the--; line 42, after "is" insert --a view--.

Column 2, line 5, "0/sg." should read --#/sq.--; lines 7 and 25, "0/sq." should read --#/sq.--; line 39, "0sq." should read --#/sq.--; line 42, "1000/sq." should read --100 #/sq.--.

Signed and sealed this 29th day of February 1972.

(SEAL)
Attest:

EDWARD M. FLETCHER, JR.       ROBERT GOTTSCHALK
Attesting Officer              Commissioner of Patents